(12) United States Patent
Calle (10) Patent No.: US 11,745,456 B2
(45) Date of Patent: Sep. 5, 2023

(54) METHOD FOR FORMING A FOOTWEAR MIDSOLE

(71) Applicant: NIKE, Inc., Beaverton, OR (US)

(72) Inventor: Juan Manuel Calle, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 784 days.

(21) Appl. No.: 16/548,648

(22) Filed: Aug. 22, 2019

(65) Prior Publication Data

US 2020/0070455 A1 Mar. 5, 2020

Related U.S. Application Data

(60) Provisional application No. 62/723,912, filed on Aug. 28, 2018.

(51) Int. Cl.
| | |
|---|---|
| B29D 35/00 | (2010.01) |
| B29D 35/12 | (2010.01) |
| B29D 35/06 | (2010.01) |
| A43B 13/18 | (2006.01) |
| A43B 13/04 | (2006.01) |
| B29K 105/04 | (2006.01) |
| B29K 75/00 | (2006.01) |

(52) U.S. Cl.
CPC .......... *B29D 35/0027* (2013.01); *A43B 13/04* (2013.01); *A43B 13/187* (2013.01); *B29D 35/061* (2013.01); *B29D 35/062* (2013.01); *B29D 35/122* (2013.01); *B29K 2075/00* (2013.01); *B29K 2105/04* (2013.01)

(58) Field of Classification Search
CPC . B29D 35/061; B29D 35/081; B29D 35/0027
See application file for complete search history.

(56) References Cited

U.S. PATENT DOCUMENTS

| | | | |
|---|---|---|---|
| 297,633 | A | 4/1884 | Reynolds |
| 1,825,276 | A | 9/1931 | Hollier |
| 2,047,960 | A | 7/1936 | Hadaway |
| 2,247,818 | A | 7/1941 | Nast |
| 2,641,004 | A | 6/1953 | Whiting et al. |

(Continued)

FOREIGN PATENT DOCUMENTS

| | | |
|---|---|---|
| CN | 2660953 Y | 12/2004 |
| CN | 200968386 Y | 10/2007 |

(Continued)

OTHER PUBLICATIONS

International Preliminary Report on Patentability received for PCT Patent Application No. PCT/US2019/047771, dated Mar. 11, 2021, 8 pages.

(Continued)

*Primary Examiner* — Seyed Masoud Malekzadeh
*Assistant Examiner* — Jennifer L Groux
(74) *Attorney, Agent, or Firm* — SHOOK, HARDY & BACON, L.L.P.

(57) ABSTRACT

Methods and systems are provided for forming an article of footwear. In one example, forming the article of footwear includes using a perforated last during molding of a midsole of the article of footwear. The midsole may be attached to a seam of the upper of the article footwear to secure the midsole to the upper.

8 Claims, 9 Drawing Sheets

(56) References Cited

U.S. PATENT DOCUMENTS

| | | | | |
|---|---|---|---|---|
| 3,813,201 | A | * | 5/1974 | Frederick ............ B29D 35/0063 249/105 |
| 3,855,657 | A | * | 12/1974 | Mazzotta ................ A43B 13/04 425/119 |
| 4,245,406 | A | * | 1/1981 | Landay ................... B29D 35/10 428/116 |
| 4,601,078 | A | | 7/1986 | Bertolaja |
| 4,651,443 | A | | 3/1987 | Eckstrom |
| 5,132,063 | A | * | 7/1992 | Hughes ................. B29C 44/146 264/46.4 |
| 5,177,824 | A | | 1/1993 | Ou |
| 5,785,909 | A | | 7/1998 | Chang et al. |
| 5,930,917 | A | * | 8/1999 | Pavelescu .............. A43B 7/125 36/12 |
| 6,168,741 | B1 | * | 1/2001 | Foldes ................. A43B 1/0027 425/577 |
| 8,968,633 | B2 | | 3/2015 | Yoon et al. |
| 9,585,438 | B2 | | 3/2017 | Johnson et al. |
| 9,713,361 | B2 | | 7/2017 | Fisher et al. |
| 2003/0140522 | A1 | | 7/2003 | Liu |
| 2007/0180730 | A1 | | 8/2007 | Greene et al. |
| 2007/0180731 | A1 | * | 8/2007 | Polegato Moretti ........................ B29D 35/062 36/14 |
| 2009/0071035 | A1 | | 3/2009 | La Rochelle |
| 2010/0242312 | A1 | | 9/2010 | Lim et al. |
| 2011/0047720 | A1 | | 3/2011 | Maranan et al. |
| 2011/0047721 | A1 | | 3/2011 | Sills et al. |
| 2012/0233877 | A1 | | 9/2012 | Swigart |
| 2012/0260526 | A1 | | 10/2012 | Smith |
| 2013/0276333 | A1 | * | 10/2013 | Wawrousek ......... A43B 13/141 36/102 |
| 2015/0089841 | A1 | | 4/2015 | Smaldone et al. |
| 2015/0374070 | A1 | | 12/2015 | Tawney et al. |
| 2016/0044985 | A1 | | 2/2016 | Lien |
| 2016/0242510 | A1 | | 8/2016 | Fisher et al. |
| 2017/0099908 | A1 | | 4/2017 | Lee et al. |
| 2017/0325546 | A1 | | 11/2017 | Becker et al. |

FOREIGN PATENT DOCUMENTS

| | | | |
|---|---|---|---|
| CN | 202160760 | U | 3/2012 |
| GB | 899477 | A | 6/1962 |
| GB | 996559 | A | 6/1965 |
| JP | 8-224110 | A | 9/1996 |
| KR | 200430644 | Y1 | 11/2006 |
| KR | 20180037547 | A * | 4/2018 |
| WO | 2011049306 | A2 | 4/2011 |

OTHER PUBLICATIONS

"Shoe lasts: High quality lasts for the international footwear industry," Fahus GreCon Website, Available Online at https://fagus-grecon.us/en/shoe-lasts-moulds/shoe-lasts/, Available as Early as Jan. 1, 2019, 6 pages.

Office Action received for European Patent Application No. 19762663. 3, dated Dec. 9, 2021, 7 pages.

ISA European Patent Office, International Search Report and Written Opinion Issued in Application No. PCT/US2019/047771, dated Nov. 22, 2019, WIPO, 14 pages.

Extended European Search Report received for European Application No. 22178176.8 , dated Jun. 28, 2022, 8 pages.

Intention to Grant received for European Patent Application No. 19762663.3, dated Jul. 7, 2022, 6 pages.

Office Action received for European Patent Application No. 22178176. 8, dated May 23, 2023, 6 pages.

* cited by examiner

METHOD FOR FORMING A FOOTWEAR MIDSOLE

CROSS REFERENCE TO RELATED APPLICATIONS

The present application claims priority to U.S. Provisional Patent Application No. 62/723,912, entitled "METHOD FOR FORMING A FOOTWEAR MIDSOLE", filed on Aug. 28, 2018. The entire contents of the above-listed application are incorporated herein by reference for all purposes.

FIELD

The present description relates generally to methods and systems for forming a footwear sole directly onto a lasted upper.

BACKGROUND

A sole, such as a midsole is a component of a shoe and may be attached to an upper. The sole can provide cushioning and stability to the shoe and, particularly for athletic footwear, absorb shock and control excessive foot motion, such as pronation and supination. A durability and aesthetic appeal of the midsole may be affected by a manufacturing process of the midsole.

SUMMARY

A method for forming a sole, such as a midsole, for a shoe may include a perforated last. The perforated last may allow gases generated during a chemical reaction to form the midsole to be vented. The midsole may be attached to an upper of the shoe by adhering to a bottom edge of the upper or percolating through stitching of a sock liner. The resulting sole may include improved properties. A perforated last may also be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-11 and 13 are shown approximately to scale

DETAILED DESCRIPTION

Figure 1:
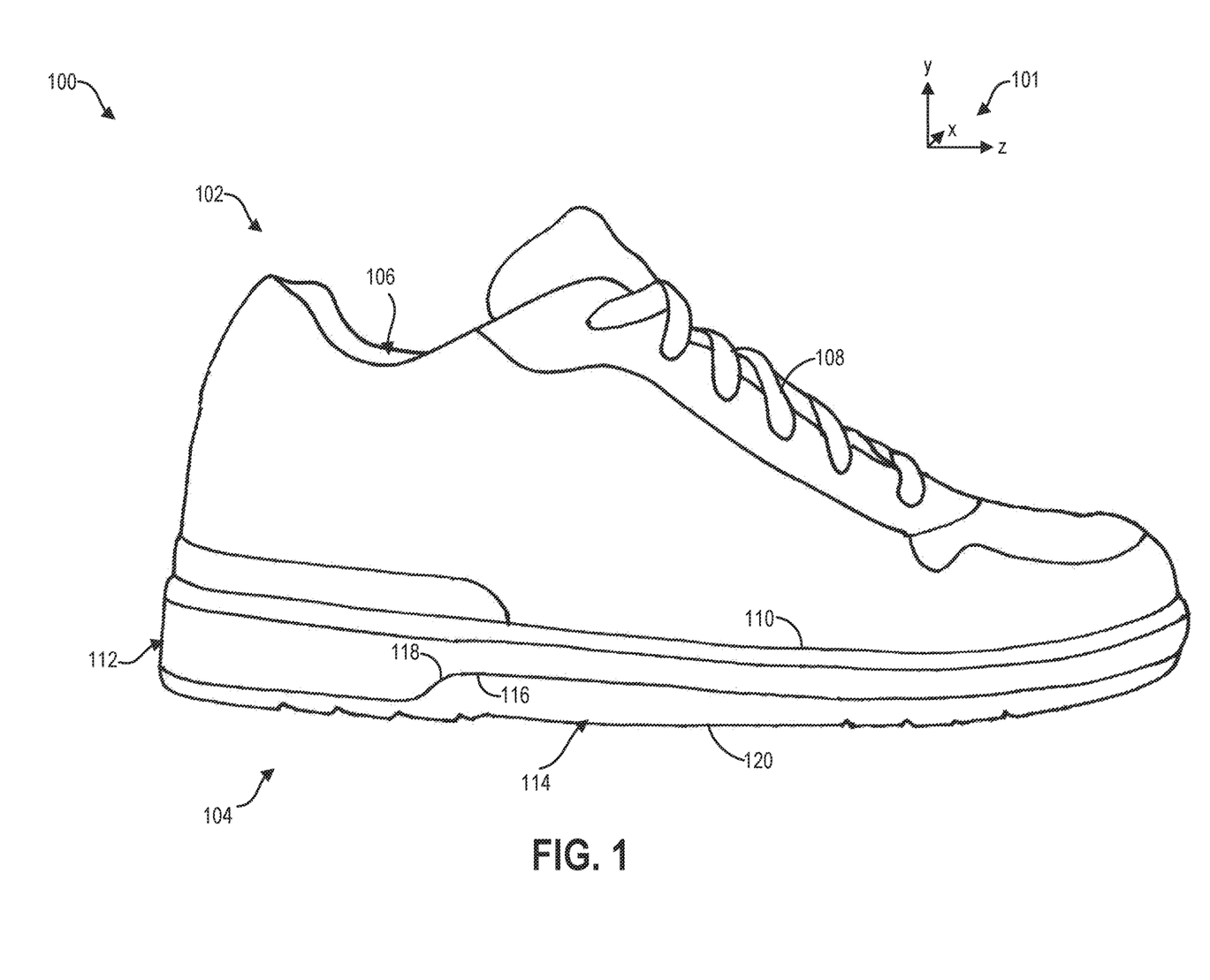
FIG. 1 shows an example of a shoe with an upper and a sole structure.
Figure 3:
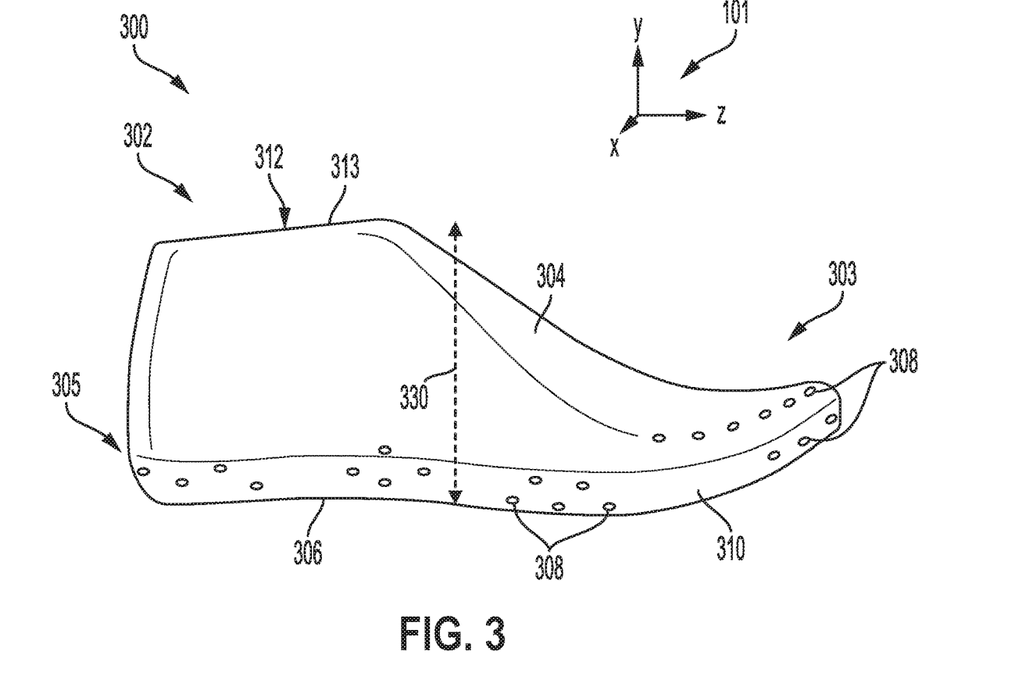
FIG. 3 shows a side view of a first example of a perforated last.
Figure 4:
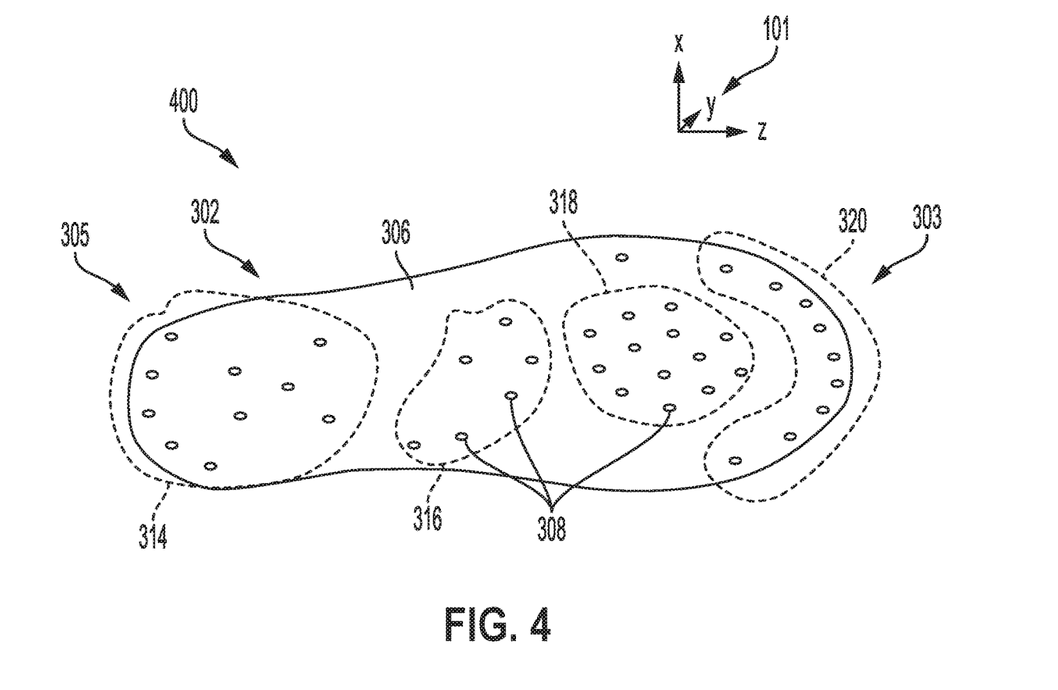
FIG. 4 shows a bottom view of the perforated last.
Figure 5:
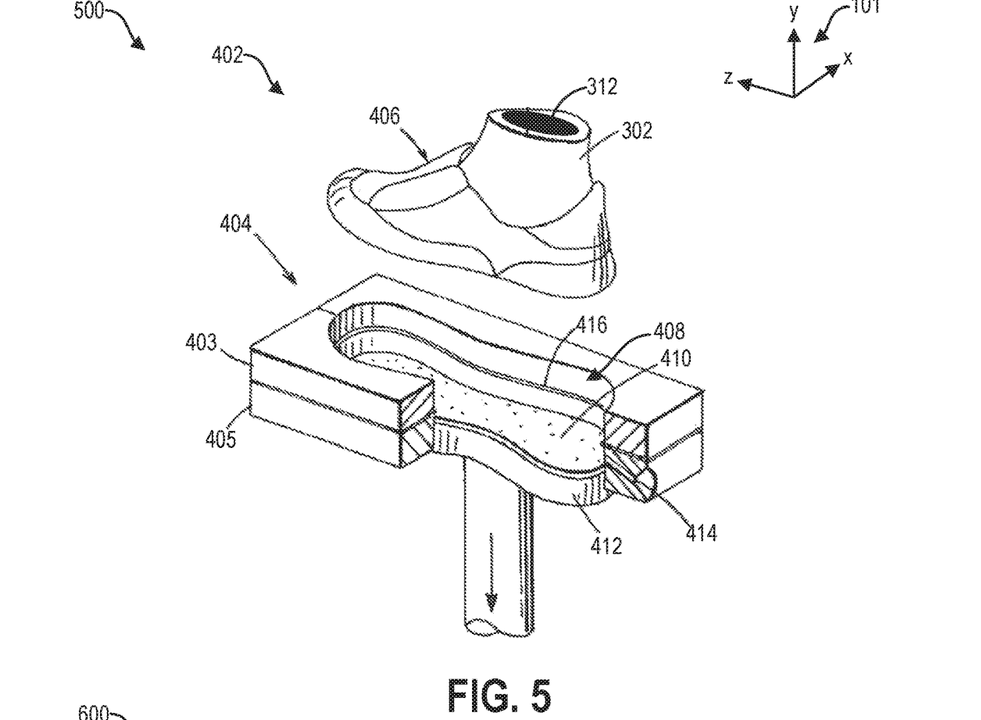
FIG. 5 shows an example of a first step in a manufacturing process of a shoe.
Figure 6:
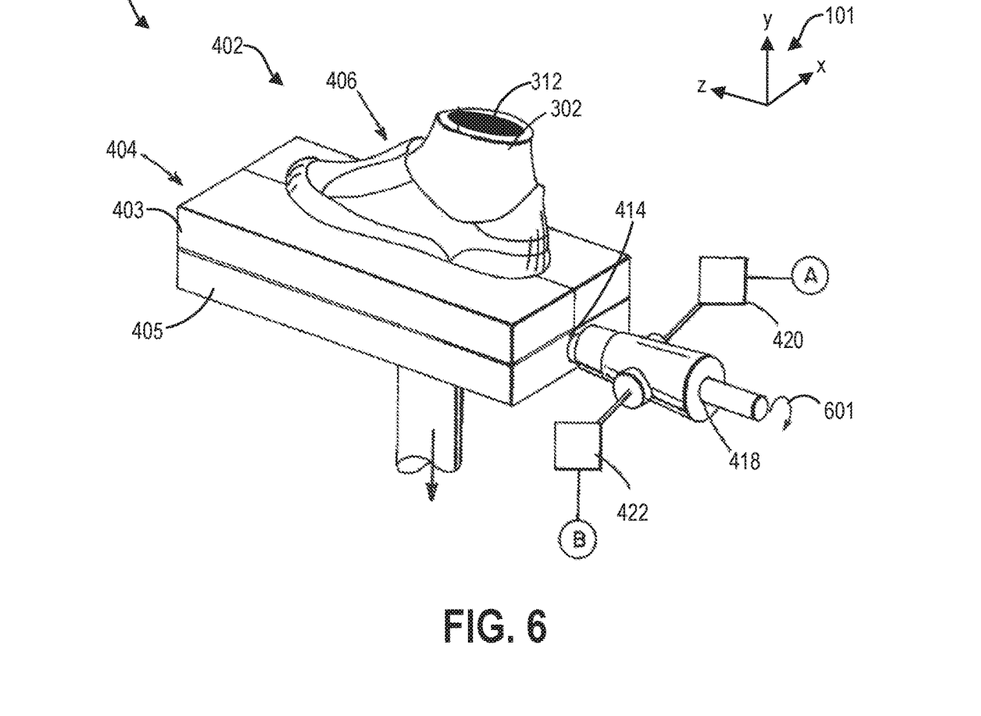
FIG. 6 shows an example of a second step in a manufacturing process of a shoe.
Figure 7:
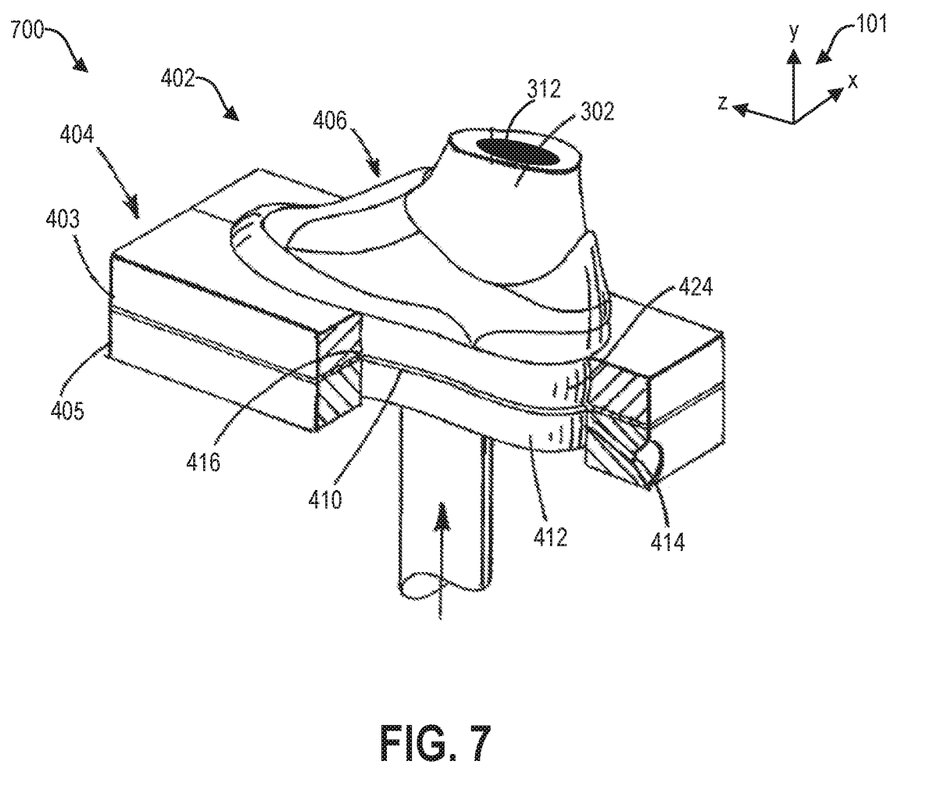
FIG. 7 shows an example of a third step in a manufacturing process of a shoe.
Figure 8:
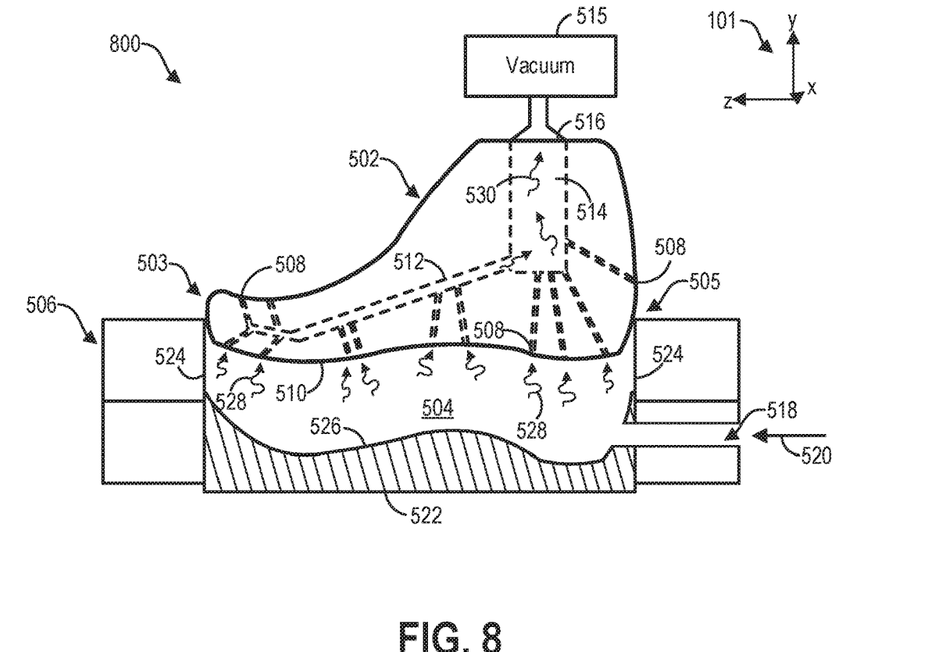
FIG. 8 shows a cross-section of a second example of a perforated last positioned over a mold during sole formation.
Figure 9:
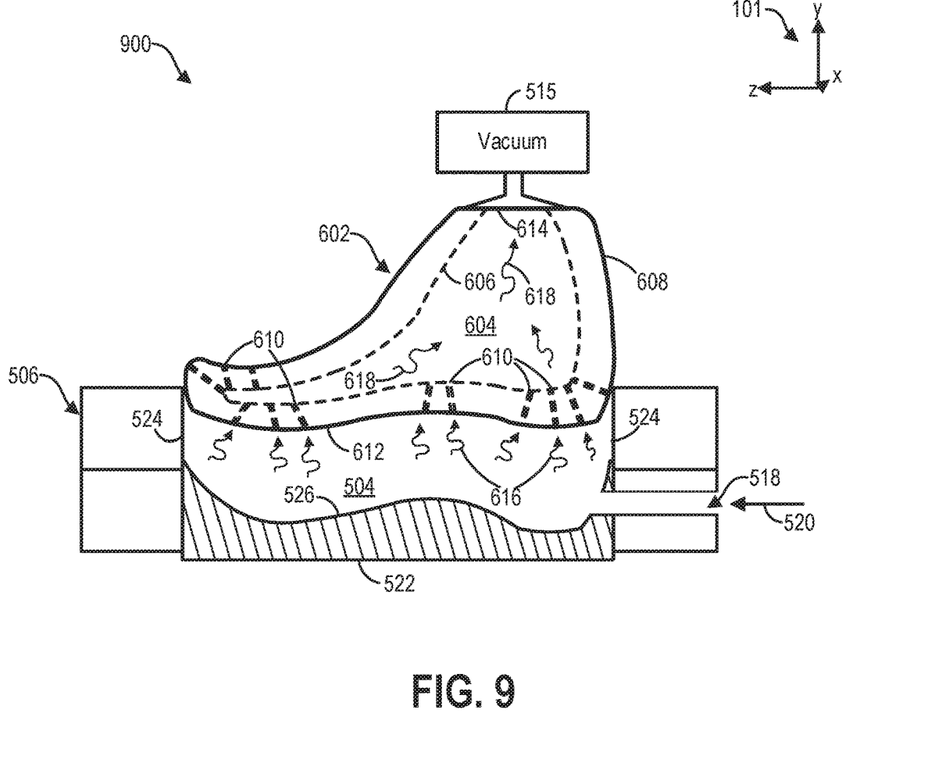
FIG. 9 shows a cross-section of a third example of a perforated last positioned over a mold during sole formation.
Figure 10:
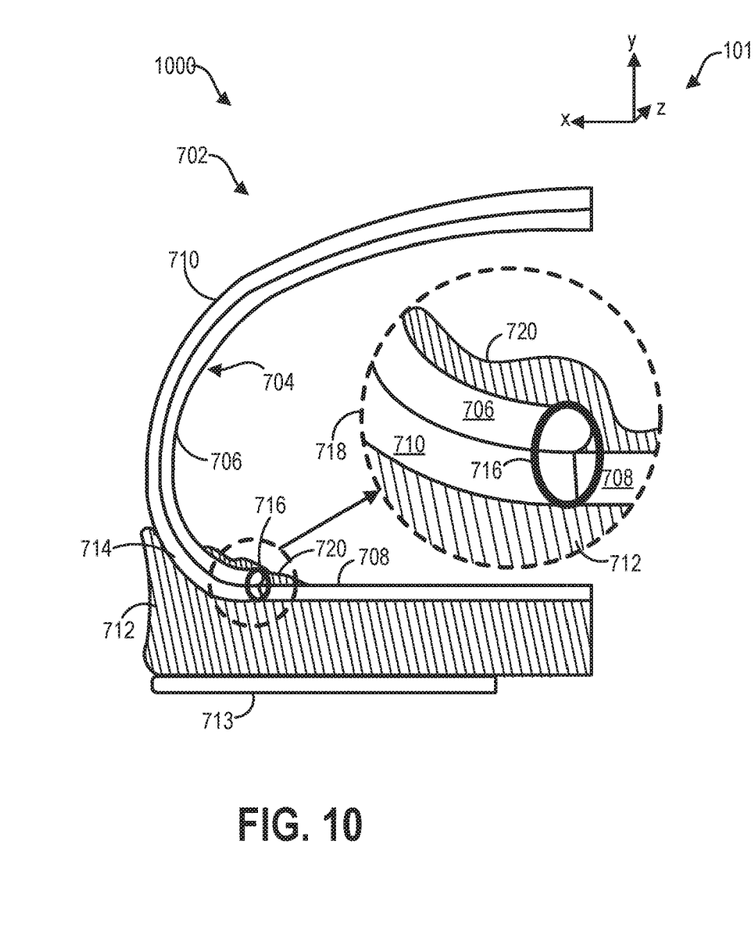
FIG. 10 shows a cut-away view of a first example of a method for attaching a sole to an upper of a shoe.
Figure 11:
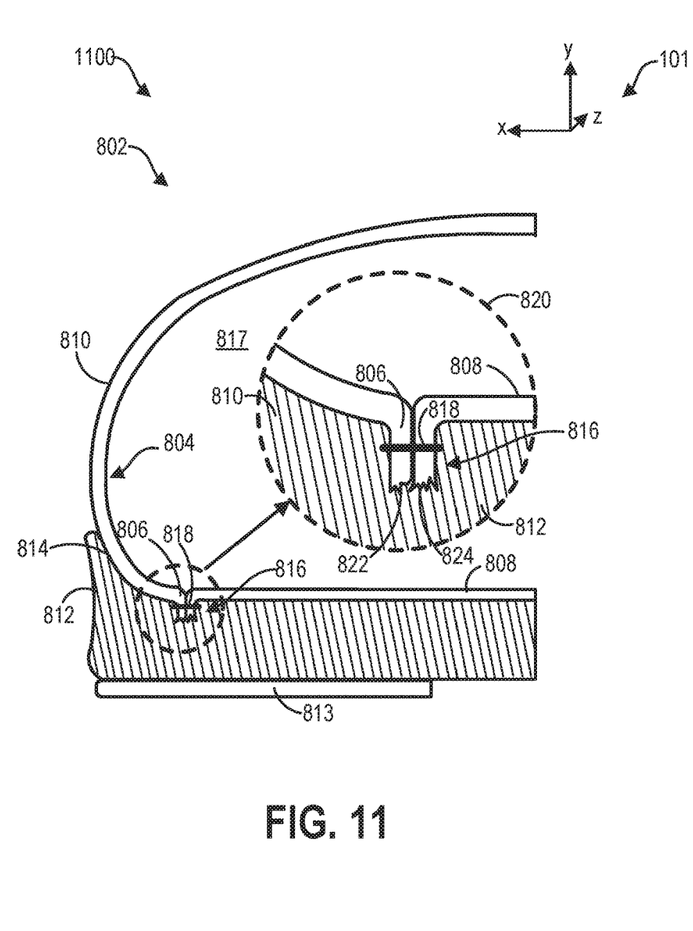
FIG. 11 shows a cut-away view of a second example of a method for attaching a sole to an upper of a shoe.

The following description relates to systems and methods for manufacturing an article of footwear, and in one example, for manufacturing an athletic shoe. An example of a shoe is shown in FIG. 1. The shoe may include an upper connected to a sole structure. The sole structure comprises one or more of an insole, a midsole, and an outsole. The components of the sole structure, as well as the upper of the shoe is depicted in an exploded view in FIG. 2 to show an ordering and geometry of the shoe elements. The midsole may be formed via injection molding, including mounting the upper on a perforated last for attachment of the midsole to the upper. An example of the perforated last is shown in FIGS. 3-4, illustrating positioning of perforations along surfaces of the last. The perforated last may be used during a process for forming the midsole and attaching the midsole to the upper of the shoe. Steps of the process are shown in FIGS. 5-7, illustrating a use of a mold into which a foamed material of the midsole may be injected or open poured/casted with the upper, mounted on the perforated last, positioned above the midsole and an outsole arranged below the midsole. Cross-sections of embodiments of the perforated last are shown in FIGS. 8-9 and 13, depicting a positioning of the perforated last relative to a cavity of the mold during formation of the midsole as well as geometries of an inner conduit of the perforated last. The foamed material of the midsole may attach to a sock liner or a seamed footbed of the upper of the shoe upon curing. Methods for attaching the midsole to the upper via curing of the midsole to the sock liner and seamed footbed are shown in cut-away views of FIGS. 10-11 and 8, illustrating a method comprising a Strobel seam of the sock liner and a method comprising a blind seam of the seamed footbed, respectively. An example of a method for manufacturing the shoe, including use of a perforated last and injection molding, open pouring or casting, for midsole formation, is provided in FIG. 12.

Footwear, and in particular, athletic footwear, may include an upper and a sole structure. While the upper covers a foot and securely positions the foot with respect to the sole structure, the sole structure is positioned under the foot and provides a barrier between the foot and the ground. The sole structure may attenuate ground reaction forces, provide traction and stability, and control foot motion. By attaching the upper to the sole structure to form a shoe, the foot may be surrounded and supported by the shoe so that the wearer may comfortably participate in recreational activities, such as walking and running.

The sole structure may be formed from one or more stacked layers including an insole, a midsole, and an outsole. The insole may be a topmost layer positioned in the upper and configured to be adjacent to a plantar surface of the foot or liner and engage comfortably with the foot. The midsole may be secured to the upper along a length of the upper and form a middle layer of the sole structure between the insole and the outsole. Shock absorption, stability, and motion control are imparted to the wearer's foot by the midsole. The outsole is a bottommost layer of the sole structure and contacts the ground, due to its positioning under the midsole. The outsole may be formed from a durable, rugged material adapted with texturing to provide traction to the shoe. The example layers are for illustrative purposes and one or more of them may include multiple components and/or layers or be divided into continuous and/or discontinuous sections. Further, various layers may be omitted.

A performance of the shoe may be affected by properties of the midsole. For example, for a wearer desiring a high degree of comfort for long distance running, a thicker midsole may be desired. Wearers with foot conditions, such as plantar faciitis, may choose shoes with a firm midsole while trail runners may use shoes with thin midsoles to increase a stability of the foot relative to changes in ground terrain. A secure and comfortable attachment of the midsole to the upper may have a significant impact on a durability of the shoe and consumer appeal of the shoe. The appeal of the shoe may be further affected by aesthetic properties of the shoe, such as unmarred surfaces of the sole structure and smooth, continuous joints between components of the shoe.

The midsole may be formed from a polymer foam material, such as polyurethane (PU), ethylene vinyl acetate (EVA), rubber, or silicone, and constructed by compression molding, injection molding, open pouring, casting, among others. For athletic footwear, in one example, the midsole may be formed via an injection molding process that includes injecting a foaming material, such as PU, into a mold and allowing the foaming or foamed material to cure and harden onto the upper. The midsole may be attached to the upper by applying an adhesive and the outsole may be molded directly to the bottom surface of the midsole or also fixed to the midsole by an adhesive. Alternatively, the midsole may be directly attached to the upper during the injection step by positioning the upper over the mold during injection of the foaming material. A last may be inserted into the upper to provide a structural frame to the upper during the injection process. The last may be a mechanical form with a structure similar to a foot and constructed from a rigid material such as wood, metal, or high-density plastic, among others or combinations thereof. The foaming material may seep through fibers of the upper as well as Strobel or blind seam stitching extending around a perimeter of a foot bed of the inner, thus attaching the midsole to the upper through gaps in the upper materials when the foaming material hardens.

The inventors herein have recognized several issues with the methods described above. For example, during injection and curing of the foaming material, off-gassing may occur which releases macro bubbles, air traps, and/or voids in the midsole material. Macro bubbles, air traps, and voids may be pockets of air with a diameter of at least 2 mm. The foaming material may be enclosed by surfaces of low porosity, such as the mold surfaces and the last, resulting in a trapping of the bubbles, air traps, and voids within the midsole. A presence of macro bubbles, air traps, and voids in the midsole may appear as undesirable blemishes on an exterior surface of the midsole.

One or more of the issues described above may be at least partially addressed by a method for an article of footwear, comprising positioning a perforated last relative to a mold cavity, and injecting a material configured to form a foam into the cavity to form a sole directly attached to an upper around the perforated last. In one example, the method includes using a perforated last. The perforations may extend through a thickness of the last to fluidly couple air surrounding the last to air within an inner conduit of the last. The perforations may create a fluid coupling, during injection molding, opening pouring, or casting, between an interior of the mold cavity and a surrounding atmosphere through the last. Further, off-gassing release may be assisted by applying a vacuum to one or more passages formed in the last via the perforations. Gas produced during injection molding may be vented through the perforations, reducing a likelihood of formation of macro bubbles, air traps, and voids.

In addition, the perforated last may be used in combination with direct molding of the midsole to the upper with attachment between the upper and midsole achieved by either allowing the foaming material to seep through the upper materials (e.g., fibers or weave) or by engaging the midsole with a seamed footbed of the upper. Furthermore, even though there is a fluid passage enabling gas to escape, the sole material is held in place by the footbed or sock or other structure of the upper. This eliminates or minimizes trimming sole material seeping beyond a desired border, e.g., outer shape, of the midsole, thereby further reducing costs associated with manual labor. Additional details and components of the method are elaborated in further detail with respect to the descriptions of FIG. 1

Turning now to FIG. 1, a shoe 100 may comprise an upper 102 and a sole structure 104. A set of reference axis 101 is provided, indicating a y-axis, an x-axis, and a z-axis. The upper 102 may be arranged above the sole structure 104 and adapted to allow a foot to be inserted into a cavity of the shoe 100 through an opening 106. The foot is held in place in the shoe 100 by the upper 102 and may directly contact inner surfaces of the upper 102. To provide comfortable engagement of the foot with the upper 102, the upper 102 may be constructed from a flexible synthetic material, such as polyester, nylon, synthetic leathers, or a natural material such as leather. The shoe 100 may further include a sock liner arranged along an inner surface of the upper 102, inside the cavity of the shoe, and attached to the upper 102 by stitching.

The upper 102 may be adapted with a lacing system 108 including a set of laces threaded through apertures in the upper 102 along a region of the upper 102 adjacent to an instep of the foot when the shoe 100 is worn. In other examples, the upper 102 may have a Velcro attachment instead of the lacing system 108 or neither the lacing system 108 or the Velcro attachment. The lacing system may be used to tighten the upper around the foot and enhance a securing of the foot inside the shoe 100.

The upper 102 may be secured along a bottom edge 110 to the sole structure 104. The sole structure may include an insole positioned inside the cavity of the shoe 100 along a footbed of the shoe, a midsole 112, and an outsole 114. The midsole 112 is directly adjacent to and above the outsole 114 so that the midsole 112 and the outsole 114 are in face-sharing contact, the shared face coplanar with an x-z plane. The midsole 112 may be a compressible layer of a foamed material, such as ethylene vinyl acetate (EVA), polyurethane (PU) or thermoplastic polyurethane (TPU) and, as described above, configured to attenuate ground forces and decrease impact transferred to the foot due to contact of the shoe with the ground. In some examples a thickness, defined along the y-axis, of the midsole 112 may vary according to a desire for increased shock absorption at certain regions relative to the foot. For example, a region under a heel of the foot may be thicker than a region under a ball of the foot if the shoe 100 is adapted for long distance running. In addition, a firmness of the midsole 112 may be non-uniform along the midsole 112 to provide stability or cushioning in desired regions of the midsole 112.

The outsole 114 may have an upper face 116 that is contoured to match a bottom face 118 of the midsole 112. A bottom face 120 of the outsole 114 may be textured to provide traction to the shoe 100. The outsole 114 may be formed from a material that is less compressible and more durable than the midsole 112, such as carbon rubber or blown rubber.

Figure 2:
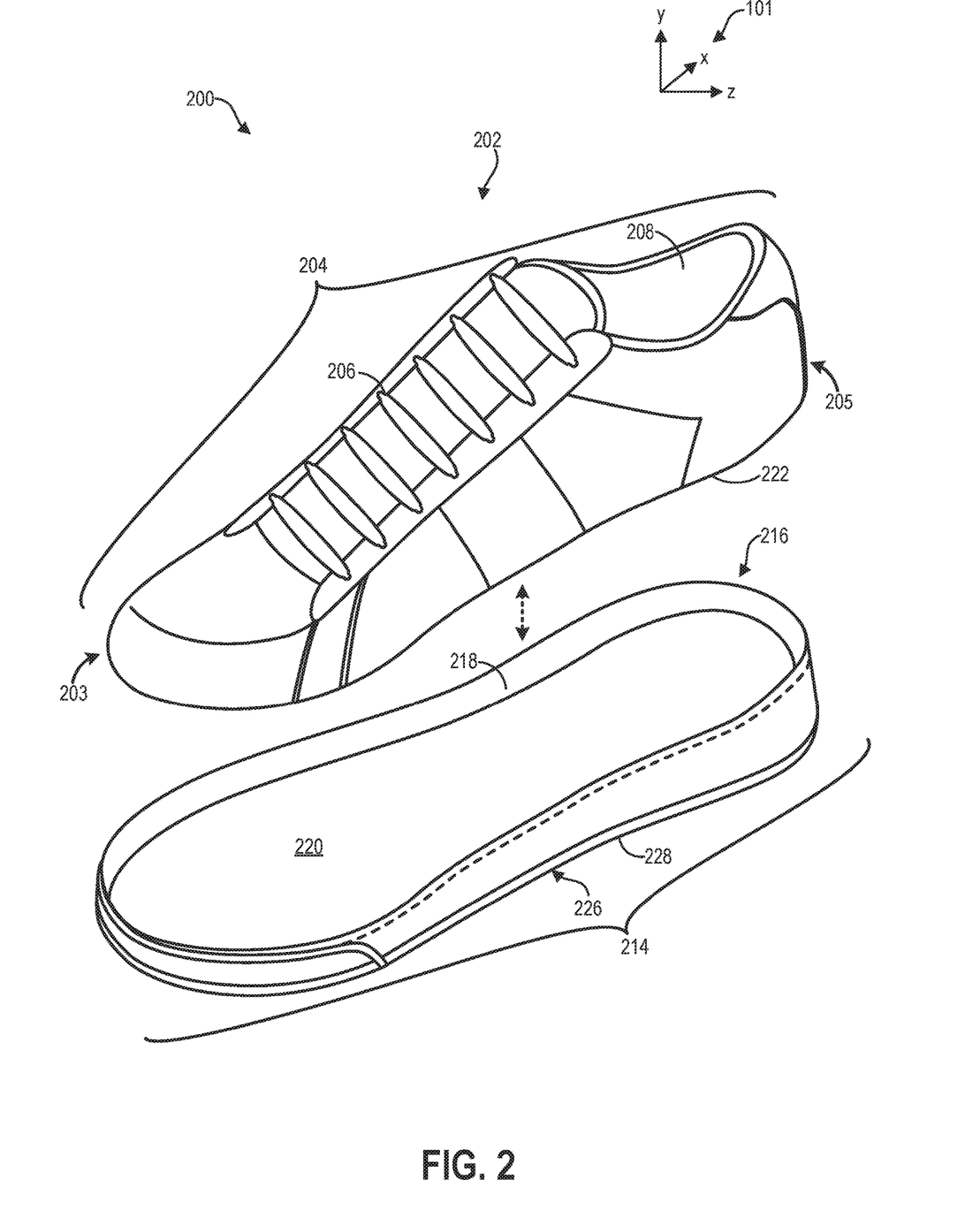
FIG. 2 shows an exploded view of an example of a shoe.

The components of a shoe 202 are shown in an exploded view 200 in FIG. 2. The shoe 202 has a toe region 203 and a heel region 205 and comprises an upper 204 with a lacing system 206 and an opening 208 as well as a sole structure 214 that includes a midsole 216, and an outsole 226. The upper 204 may have an attached sock liner (not shown in FIG. 2) that lines an interior of the upper 204 or may be directly stitched to a seamed footbed that provides a bottom surface to the upper 204. Furthermore, in some examples, the sole structure 214 may also include an insole positioned below the upper 204 and above the midsole 216 that is contoured to match a shape of a foot. The insole may be arranged above the sock liner or the seamed footbed at a bottom of an inner cavity of the shoe 202 and may be formed from EVA.

The sole structure 214 may be shaped to match an outer geometry of a bottom edge 222 of the upper 204. The midsole 216 may have a raised edge 218 surrounding at least a portion of a perimeter of the midsole 216 that extends above an upper surface 220 of the midsole. A width of the midsole 216, defined along the x-axis, may be wider than a width of the upper 204 and the insole 210 so that the bottom edge 222 of the upper 204 may fit within and be surrounded by the raised edge 218 of the midsole 216.

Portions of the outsole 226 in FIG. 2 may be similarly shaped as the midsole 216 but the outsole 226 may alternatively comprise a plurality of sections that are fixed to regions of a bottom surface of the midsole 216. The outsole 226 may be adapted to provide traction in desirable regions of the sole structure 214, such as under a ball of the foot. The outsole 226 may be thinner, as defined along the y-axis, than the midsole 216. The outsole 226 may be contoured to match a shape of the midsole 216 and include a textured bottom face 228.

A process to attach the components of the shoe 202 shown in FIG. 2 to form a unitary article of footwear may include the use of a last. The last may be a structure shaped similarly to a foot and formed from a rigid material such as wood, metal, or high density plastic. An upper and a sole structure of a shoe may be formed around the last and thus an overall shape of an interior of the shoe may depend on a geometry of the last.

During shoe formation, the upper may be wrapped snugly around an upper portion of the last. The last, and the upper, may be positioned on top of a mold so that the last is sealingly engaged with a top edge of the mold. A foamed material may be injected, open poured, or casted into a cavity of the mold, which may be a sealed chamber due to the positioning of the last over the mold. As the foamed material cures, gases may be generated that remain trapped within the cavity of the mold and within a material of the midsole. The trapped gases may form macro bubbles, air traps, or voids that may be visible along an outer surface of the midsole after curing is complete, leaving undesirable cosmetic defects.

To address the issue of macro bubble formation in the midsole, a perforated last may be used. A first example of a perforated last 302 is shown from a side view 300 in FIG. 3 and from a bottom view 400 in FIG. 4. The perforated last 302 has an upper portion 304, as shown in FIG. 3, shaped to represent an upper region of a foot and a lower region of an ankle. The upper portion 304 of the perforated last 302 has a forefoot portion 303, representing an instep and toes of the foot and a heel portion 305, representing a heel of a foot. An upper, such as the upper 102 of FIG. 1 and 204 of FIG. 2, and including a sock liner, may be fitted around the upper portion 304 of the perforated last 302 and fastened tightly to secure the upper in place.

When the perforated last 302 is placed over a mold and a foamed material is injected into the mold to form a midsole, the midsole may conform to a shape of a footbed 306 of the perforated last 302, as shown in FIG. 4. The footbed 306 may be a bottom surface of the perforated last 302 and couple to the upper portion 304 via curved surfaces so that the perforated last 302 has a smooth continuous form.

The perforated last 302 may include perforations 308 extending through a thickness of the perforated last 302. In one example, the perforated last 302 may be substantially hollow, with an inner conduit 312 that extends through the perforated last 302 so that the perforated last 302 is a shell with a thickness through which the perforations 308 may extend. In this way, air in the inner conduit 312 is fluidly coupled to air surrounding the perforated last 302 through the perforations 308. In another example, the perforated last 302 may be substantially solid and the inner conduit 312 extends down from an opening at a top of the perforated last 302 through a portion of a height 330 of the perforated last 302, the height 330 defined along the y-axis. A manifold, arranged within the perforated last 302, may be coupled to the inner conduit 312, fluidly coupled to the inner conduit 312 and extending substantially horizontally (e.g., along the z-axis) through the perforated last 302. The perforations 308 may be fluidly coupled to the manifold, thereby fluidly coupling air surrounding the perforated last 302 to air inside the inner conduit 312.

The perforations 308 may be distributed in various regions of the perforated last 302, such as along a lower edge 310 of the upper portion 304 of the perforated last 302 as shown FIG. 3. The perforations 308 may also be disposed in the footbed 306 of the perforated last 302. The perforations 308 may be arranged in clusters or spaced apart evenly. The clusters of the perforations 308 may be positioned in regions where the midsole is anticipated to be thicker, such as under a heel of the foot along the footbed 306 in dashed region 314, along an arch of the foot in dashed region 316, under a ball of the foot in dashed region 318, or under toes of the foot in dashed region 320. The perforations 308 may also be clustered at regions where macro bubbles, air traps, and/or voids in the midsole may affect coupling of the midsole to the upper, such as along the lower edge 310 of the upper portion 304 of the perforated last 302 or along an upper surface of the forefoot portion 303 of the perforated last 302, proximal to a perimeter of the perforated last 302, as shown in FIG. 3.

It will be appreciated that the perforated last 302 of FIGS. 3 and 4 is a non-limiting example. Some examples of the perforated last 302 may include perforations 308 arranged in different patterns, spacing, size, geometry, and positions, relative to surfaces of the perforated last 302, from those indicated in the present disclosure. Other examples may include different combinations of the clusters of perforations. For example, the shoe may have clusters of perforations 308 under the toes (dashed region 320) and along the arch (dashed region 316) or under the ball of the foot (dashed region 318) and under the heel (dashed region 314) or just under the ball of the foot. Numerous variations of the perforations 308 and clustering of the perforations 308 have been envisioned. Further, some or all of the example passages, connections, and/or manifolds illustrated in FIGS. 8-11 and 13 may be incorporated in the last(s) of FIGS. 3-4.

As described above, the perforated last 302 may include the inner conduit 312 extending through the perforated last 302 so that the perforated last 302 is substantially hollow while the thickness of the perforated last 302 is sufficient to maintain a structural integrity of the perforated last 302. Alternatively, the perforated last 302 may be substantially solid with a relatively shorter and narrower inner conduit 312 extending through a portion of the perforated last 302 and coupled to a manifold. The perforations 308, extending through the thickness of the perforated last 302, may fluidly couple air inside the inner conduit 312 to air outside of and surrounding the perforated last 302. Further details of a geometry of the perforations 308 are shown in FIGS. 8-9 and elaborated further below. The fluid coupling of air inside and outside of the perforated last 302 may allow gases formed during curing of the midsole to vent through the perforations 308. Pressure in the midsole due to off-gassing may be equalized across the perforations 308, releasing the gases to the atmosphere. In some examples, the inner conduit of the perforated last 302 may be coupled to a vacuum pump to further encourage evacuation of gases from the midsole during injection of the foamed material.

The venting of gases assisted by vacuum may be applied during a manufacturing process of a shoe. Additionally, or alternatively, venting to atmosphere unassisted by vacuum may also be used, if desired. Further, the level of vacuum applied may be adjusted during the manufacturing process. In one example, the vacuum level may be increased in response to formation of defects (which may be identified via a camera/inspection system automatically based on image processing of molded products) on the surface of the midsole, for example.

The manufacturing process is illustrated in the perspective views 500, 600, and 700 of FIGS. 5-7, respectively, of an example of a method that uses the perforated last 302 (e.g., the perforated last 302 of FIG. 3) and a mold 404 to form a midsole of a shoe 402. The mold 404 is shown in FIGS. 5 and 7 with a portion of the mold cut away for illustrative purposes. The perforated last 302 may be hollow and include the inner conduit 312 fluidly coupled to perforations, such as the perforations 308 of FIGS. 3-4, of the perforated last 302. An upper 406 of the shoe may be mounted tightly over the upper portion of the perforated last 302. A footbed may be arranged between the upper and the perforated last 302, the footbed attached to the perforated last 302 by stitching, glue, or fusing.

As illustrated in FIG. 5, the perforated last 302 may be positioned over a cavity 408 in the mold 404. The cavity 408 may be shaped similarly to the footbed of the perforated last 302 at a top of the cavity 408, with respect to the y-axis, and may vary in geometry as the cavity 408 extends down into the mold 404, depending on a desired shape of the midsole. For example, the cavity 408 may be configured to impart the midsole with curved sides, a textured pattern, or a widening of the midsole along the x-z plane, in a downwards direction away from the upper 406 of the shoe 402.

The cavity 408 may extend entirely through thicknesses, defined along the y-axis, of a first half 403 and a second half 405 of the mold 404. The first half 403 may be stacked on top of the second half 405 so that the cavity 408 is aligned through the first half 403 and the second half 405. The second half 405 may include an inlet port 414 extending from an edge of the second half 405 of the mold 404 to the cavity 408, which fluidly couples air surrounding the second half 405 of the mold 404 to air inside the cavity 408. A thin flash 416 may run around a circumference of the cavity 408, between the first half 403 and the second half 405, extending a short distance in to the cavity 408 of the mold 404. The flash 416 may seal the cavity 408 and retain foamed material, used to form the midsole, when the material is injected so that the foamed material does not leak down over the sides of an outsole 410. The outsole 410 may be arranged in the cavity 408 to form a bottom layer of the shoe 402.

A vertically-movable bottom piston 412, e.g., able to slide along the y-axis, shaped similar to the cavity 408, may be positioned at a bottom of the cavity 408 and may sealingly engage with the cavity 408 to form a floor of the cavity 408. The outsole 410 may be preformed and arranged at a bottom of the cavity 408 on top of the bottom piston 412 while the bottom piston 412 is in a lowered position, as shown in FIG. 5. An upper surface of the outsole 410 may be prepared for attachment to the midsole by roughening the upper surface, priming, and coating the upper surface with an adhesive such as cement. The cement may be heat-activated prior to formation of the midsole.

The perforated last 302 and the upper 406 may be lowered to contact the mold 404, as shown in FIG. 5. A mixer-injector 418 is inserted into the inlet port 414 and a measured amount of the foamed material, e.g., polyurethane, for example, is introduced through the inlet port 414. The foamed material may initially be a liquid or gel that foams upon mixing with a chemical that triggers a foaming reaction either before or after injection. Alternatively the material may be injected already in a foamed consistency. The amount of polyurethane does not fill the cavity 408 of the mold 404 when the bottom piston 412 is in the lowered position. Injection of the desired amount of polyurethane is achieved by timing an interval during which gear pumps 422 and 420 are turned on to deliver components A and B, which, in one example, may be isocyanate and polyol resin to form polyurethane, to the mixer-injector 418 which is rotating as indicated by arrow 601 to mix components A and B. In other examples, however, an additional component C may be included to assist in the foaming process which may be a liquid or a gas.

Upon introduction of mixed components A and B to the cavity 408, the bottom piston 412 is raised upwards, along the y-axis, so that an upper, outside edge of the outsole 410 engages with the flash 416, as shown in FIG. 7. The inlet port 414 is thereby closed off from the cavity 408 containing the polyurethane. The polyurethane foams and expands, filling the inner volume of the cavity 408 with the bottom piston 412 in a raised position to form a midsole 424, and irreversibly coupling with a lower edge of the upper 406. Off-gassing may occur as the polyurethane foams and expands, creating pockets of air within the polyurethane in the cavity 408. The gas may vent through perforations of the perforated last 302 and evacuation of the gas may be further assisted by connecting the inner conduit 312 of the perforated last 302 to a vacuum source. The finished shoe 402 may be removed by separating the first half 403 from the second half 405 of the mold 404.

As another example of the manufacturing process, the midsole may be formed by a pouring process (e.g., open pouring or casting). The bottom piston 412 may be in the raised position, engaged with the flash 416, with the mold 404 assembled so that the first half 403 is stacked on top of the second half 405, to form an open receptacle for receiving the polyurethane (or some other type of material configured to foam) as a molten phase. The polyurethane may be poured into the cavity 408 and the perforated last 302 and upper 406 placed over the cavity 408, thereby allowing the polyurethane to attach to the upper 406 as the material cures and hardens.

In this way, the perforated last 302 may provide a structural guide to form the midsole or sole of the shoe 402, scaled at a 1 to 1 ratio of the last to the midsole and/or sole. The dimensions of the perforated last 302 thus determine the final dimensions of the midsole/sole of the shoe without adjustments to account for expansion or contraction of the midsole/sole material. Injection molding or open pouring or casting of the midsole/sole at the 1:1 scale allows the midsole/sole to be directly attached to upper components of the shoe 402 during the formation process.

While FIGS. 5-7 show the perforated last in an upright position and positioned above the mold, relative to the y-axis, other examples may include different orientations of the perforated last and mold. For example, the components of the FIGS. 5-7 may be positioned upside-down with respect to the views shown or perpendicular. Various alignments where the cavity of the mold receives the footbed of the perforated last have been envisioned and are within the scope of the present disclosure.

A cross-section 800 of second example of a perforated last 502 is depicted in FIG. 8, positioned over a cavity 504 of a mold 506. The mold may be similar to the mold 404 of FIGS. 5-7. The perforated last 502 is shown without a mounted upper of a shoe, e.g., the upper 406 of FIGS. 5-7. The perforated last 502 may include perforations 508 arranged along a footbed 510 of the perforated last 502 as well as along upper surfaces of the perforated last 502. A portion of the perforations 508 proximal to a toe region 503 of the perforated last 502 may extend through a material of the perforated last 502 and fluidly couple to a manifold 512 in the last that is, in turn, fluidly coupled to an inner conduit 514 of the perforated last 502. Another portion of the perforations 508 may extend from an outer surface of the perforated last 502, to the inner conduit 514, such as the perforations proximal to a heel region 505 of the perforated last 502. The manifold 512 may be a channel extending substantially along and at an angle to the z-axis, from the toe region 503 of the perforated last to the inner conduit 514. The inner conduit may extend from an opening 516 at a top of the perforated last 502, down through a portion of a height of the perforated last 502, the height defined along the y-axis. As such, the perforated last 502 may be predominantly solid, e.g., not hollow.

A vacuum source 515, such as a vacuum pump, may be attached to the opening 516 at the top of the perforated last 502. When activated, the vacuum source may generate a low pressure region within the inner conduit 514 and the manifold 512 of the perforated last 502. As a result, when a foamed material is injected through inlet port 518 in the direction indicated by arrow 520 to form a midsole, gases generated during the midsole forming process may be forced to evacuate through the perforations 508. When the material of the midsole is injected in the cavity 504 and a bottom piston 522 is raised, similar to the process described in FIGS. 5-7, the midsole material may undergo off-gassing as a volume of the cavity 504 is decreased and the foamed material cures.

The cavity 504 may be a fully enclosed chamber when the bottom piston 522 is raised so that the inlet port is blocked and air outside of the mold 506 does not exchange with air inside the cavity 504. The cavity 504 may be surrounded by the footbed 510 of the perforated last 502, side surfaces 524 of the mold 506, and a top surface 526 of the bottom piston 522. The side surface 524 of the mold 506 and the top surface 526 of the bottom piston 522 may be continuous surfaces that block gas flow. While the footbed 510 of the perforated last 502 may be formed from a material that is impermeable to liquids, the material may be gas permeable and the perforations 508 provide vents for gases to flow. Gases may travel through the foamed material in the cavity 504 and into the perforations 508, as indicated by arrows 528 to equalize a pressure gradient between the cavity 504 and the inner conduit 514 of the perforated last 502. Gases entering perforations 508 in the toe region 503 of the perforated last 502 may be channeled into the manifold 512 and then flow to the inner conduit 514 while gases entering perforations 508 in the heel region 505 of the perforated last 502 may be evacuated directly into the inner conduit 514. The gases may be drawn to the vacuum source 515, as indicated by arrows 530, thereby reducing a likelihood that macro bubbles, air traps, or voids remain trapped within the midsole.

In another cross-section 900 of a third example of a perforated last 602, the perforated last 602 is similarly positioned over the mold 506. the perforated last 602 may have a similar external shape as the perforated last 502 of FIG. 8. The perforated last 602, however, may be substantially hollow with an inner conduit 604 that is larger in volume than the inner conduit 514 of FIG. 8, extending through the perforated last 602 so that an inner surface 606 of the perforated last 602 is spaced away from an outer surface 608 of the perforated last 602 by a relatively uniform thickness of a material of the perforated last 602. The thickness is a distance between the inner surface 606 and the outer surface 608 of the perforated last 602. In this example, the perforated last 602 is hollow and configured as a shell.

Perforations 610 may extend through the thickness of the perforated last 602, disposed in a footbed 612 as well as upper surfaces of the perforated last 602. The perforations 610 allow gases, generated during the midsole formation process, to vent from the cavity 504 of the mold 506 into the inner conduit 604 of the perforated last 602. Evacuation of gases from the foamed material of the midsole may be further assisted by actuating the vacuum source 515, coupled to an opening 614 of the inner conduit 604 at a top of the perforated last 602.

Gases in the midsole material contained in the cavity 504 may generate pressure within the cavity 504 and, unable to flow through side surfaces 524 of the mold 506 or the top surface 526 of the bottom piston 522, may be channeled through the perforations 610, as indicated by arrows 616, and into the inner conduit 604 of the perforated last 602 to alleviate the pressure gradient. The pressure gradient between the cavity 504 of the mold 506 and the inner conduit 604 of the perforated last 602 may be exacerbated by the actuating vacuum source to decrease a pressure of the inner conduit 604. Gases drawn into the inner conduit 604 of the perforated last 602 through the perforations 610 may flow to the vacuum source 515, as indicated by arrows 618.

A fourth example of a perforated last 1002 is shown in a cross-section 1300 in FIG. 13. The perforated last 1002 is similarly shaped and positioned over the mold 506 as the perforated lasts 502 and 602 of FIGS. 8 and 9, respectively. However, the perforated last 1002 of FIG. 13 may be substantially solid, e.g., without any hollowed regions or inner chambers. The perforated last 1002 may include a last extension 1004 that protrudes upwards from an upper region of the perforated last 1002. The last extension 1004 may be formed from a metal, or some other rigid material, and may be fixed to the upper region of the perforated last 1002. In one example, a vacuum source, such as the vacuum source 515 of FIGS. 5-6, may be coupled to the last extension 1004.

The perforated last 1002 may comprise a first set of perforations that are through holes 1006, extending from an upper surface 1008 of the perforated last 1002 to a bottom surface 1010 of the perforated last 1002. Air inside the cavity 504 of the mold 506 is fluidly coupled to air surrounding the perforated last 1002, external to the cavity 504, via the through holes 1006, as indicated by arrows 1005. The through holes 1006 allow gases generated during formation of a midsole in the mold cavity 504 to be vented from the cavity 504 to the surrounding atmosphere.

The perforated last 1002 may also be adapted with a second set of perforations that are blind holes 1012, extending upward from the bottom surface 1010 through a portion of a distance between the upper surface 1008 and the bottom surface 1010 of the perforated last 1002. The blind holes 1012 may be coupled to conduits 1014 extending through a material of the perforated last 1002 that fluidly couples the blind holes 1012 to a port 1016 in the last extension 1004. Gases generated during formation of the midsole in the cavity 504 of the mold 506 may be vented through the blind holes 1012, as indicated by arrows 1007 and conduits 1014 to the surrounding atmosphere. Removal of gases through the blind holes 1012 may be further aided by coupling the vacuum source to the last extension 1004.

It will be appreciated that the positioning of the manifold, inner conduit, and perforations shown in FIGS. 8, 9, and 13 are non-limiting examples of the perforated last. Other configurations of the said components of the perforated last may be varied in numerous ways, such as varying alignment, size, shape, and number, without departing from the scope of the present disclosure.

Examples of how a midsole may irreversibly attach to a lower edge of an upper of a shoe is illustrated in detail in FIGS. 10 and 11. A first cut-away view 1000 of an example of a shoe 702 is shown in FIG. 10 where Strobel stitches are used to connect an upper region 706 of a sock liner 704 to a bottom region 708 of the sock liner 704. The sock liner 704 may be an inner liner of an upper 710 of the shoe 702. A midsole 712 is arranged below the bottom region 708 of the sock liner 704 that curves up along an outer surface of the upper 710 to match a contour of a lower edge 714 of the upper 710. An outsole 713 may be attached to a bottom surface of the midsole 712.

The sock liner 704 may be similarly shaped to an interior cavity of the shoe 702 as well as to a shape of the perforated last. By arranging the sock liner 704 within the cavity of the shoe 702, the sock liner 704 may provide a comfortable interface between upper regions of a user's foot, such as an instep, and the upper 710 of the shoe and also couple the upper 710 to the midsole 712 of the shoe 702.

The sock liner 704 may be formed of a flexible, elastic knit material such as polyester, that is porous enough to allow air to flow through the material but not sufficiently porous to allow high viscosity fluids to flow through. The upper region 706 of the sock liner 704 may be attached to the bottom region 708 by a continuous border of stitching, forming a seam. In one example, the seam may be a Strobel seam that includes Strobel stitching. The Strobel seam may continue around a perimeter of the edge of the upper region 706 of the sock liner 704, forming a continuous border of Strobel stitches. A Strobel stitch 716 is shown in FIG. 10 and illustrated in greater detail in an expanded view 718. The Strobel stitch 716 may be a circular loop sewn by a Strobel machine that connects the upper 710, the upper and bottom regions 706, 708 of the sock liner 704 at an intersection of the upper 710 of the shoe 702 with the upper and bottom regions 706, 708 of the sock liner 704. At the Strobel stitch 716, the upper 710 and the bottom region 708 of the sock liner 704 may be in edge sharing contact while the upper region 706 of the sock liner 704 may be stacked above the upper 710.

Each Strobel stitch 716 of the Strobel seam may be spaced apart from adjacent Strobel stitches so that there are gaps between each Strobel stitch 716 of the seam. During injection of the foamed material of the midsole 712, the foamed material may have low enough viscosity prior to curing to seep through the gaps between each Strobel stitch 716 of the seam. However, the viscosity may be high enough to not penetrate through the material of the bottom region 708 of the sock liner 704. The seeping of the foamed material allows an amount of percolated material 720 of the midsole 712 to be disposed above the bottom region 708 of the sock liner 704 and above the upper region 706 of the sock liner 704 proximal to the Strobel stitch 716. In some examples, the foamed material may also seep through a material of the upper 710 of and the sock liner 704 if the materials are of a sufficiently high porosity.

The percolation of the foamed material through the gaps of the Strobel seam secures the midsole 712 to the upper 710 of the shoe 702. When the foamed material cures and hardens, the material of the midsole 712 extends continuously through the gaps of the Strobel seam, as well as through pores of the upper 710 materials, forming a plurality of ligaments between the midsole 712 and the percolated material 720. Thus the midsole is maintained securely in place against the lower edge 714 of the upper 710 and the bottom region 708 of the sock liner 704 by anchoring of the midsole 712 to the sock liner 704 and upper 710 via the ligaments of foamed material.

The midsole 712 may be formed in a mold, such as the mold 404 of FIGS. 5-7 and the mold 506 of FIGS. 8-9 and 13, that includes a single inlet port without additional ports or channels for exchange between air in a cavity of the mold and air surrounding the mold. In one example, a first half and a second half of the mold, with reference to the first and second halves 403, 405 of the mold 404 of FIGS. 5-7, may not include any ports to vent gases or excess foamed material. The material of the midsole 712 is confined to the cavity while gases may pass through the gas-permeable bottom region 708 of the sock liner 704. In contrast to conventional molds that include vent ports through which foamed material may seep, trimming of cured midsole material that percolates through the vent ports is no longer demanded. As a result, an amount of labor involved in the manufacturing process is reduced.

A second cut-away view 1100 of an example of a shoe 802 is shown in FIG. 11 where a blind seam may be used to connect an upper 810 of a shoe 802 to a footbed 808. The footbed 808 may be formed from a flexible material such as nylon that is porous so that air may flow through the material but is impermeable to viscous fluids. The blind seam may bind a bottom edge 806 of the upper 810 to an edge of the footbed 808 and continue around a perimeter of the footbed 808. A midsole 812 is arranged below the footbed 808 and may curve up along an outer surface of the upper 810 to match a contour of a lower portion 814 of the upper 810. An outsole 813 may be attached to a bottom surface of the midsole 812.

The bottom edge 806 of the upper 810 and the edge of the footbed 808 may be stitched so that the bottom edge 806 of the upper 810 and the edge of the footbed 808 bend at a merging region and angle downwards, along the y-axis, extending away from an interior 817 of the shoe 802 and below a horizontal stitch 818. The extension of the bottom edge 806 of the upper 810 and the edge of the footbed 808 away from the interior 817 of the shoe 802 may form a seam allowance 816.

The blind seam may comprise a plurality of horizontal stitches, represented in FIG. 11 by the single horizontal stitch 818, and illustrated in greater detail in an expanded view 820. The horizontal stitch 818 may be coaxial with the x-axis and may couple the bottom edge 806 of the upper 810 to the edge of the footbed 808 to form the seam allowance 816. The seam allowance 816 may terminate at a lower end with raw ends 822 and 824 of the upper 810 and the footbed 808, respectively.

The horizontal stitch 818 and a high density (e.g., small gaps in between) of the horizontal stitches of the blind seam, or, in some examples, overlapping horizontal stitches of the blind seam, may block a foamed material (used to form the midsole 812) from percolating through the blind seam. As the foam material cures, the material may irreversibly couple with surfaces provided by the irregularly shaped raw ends 822, 824 of the upper 810 and the footbed 808, as well as to surfaces of the seam allowance 816, and the horizontal stitch 818. The midsole 812 is thereby securely attached to the upper 810 of the shoe 802 by curing and coupling to the seam allowance 816 which extends downwards into the midsole 812.

A midsole of a shoe may be attached to an upper of the shoe by injecting a foamed material, as shown in FIGS. 5-7, and allowing the foamed material to cure and attach by either percolating through a Strobel seam, as shown in FIG. 10, or adhering to a seam allowance of a blind seam, as shown in FIG. 11. While both methods may be similarly effective for securing the midsole to the upper, the use of the blind seam may be more desirable with respect to aesthetic appeal. The percolation of the foamed material through Strobel stitches of the Strobel seam may appear as an irregular mass of hardened material along in an interior perimeter of a bottom region of a sock liner in the shoe. The blind seam, however, retains the foamed material in the midsole, imparting the interior with a more clean appearance and well-defined borders between components of the shoe, such as between the upper and the footbed. Thus, from a marketing perspective, the blind seam method may be deemed more desirable.

Figure 12:
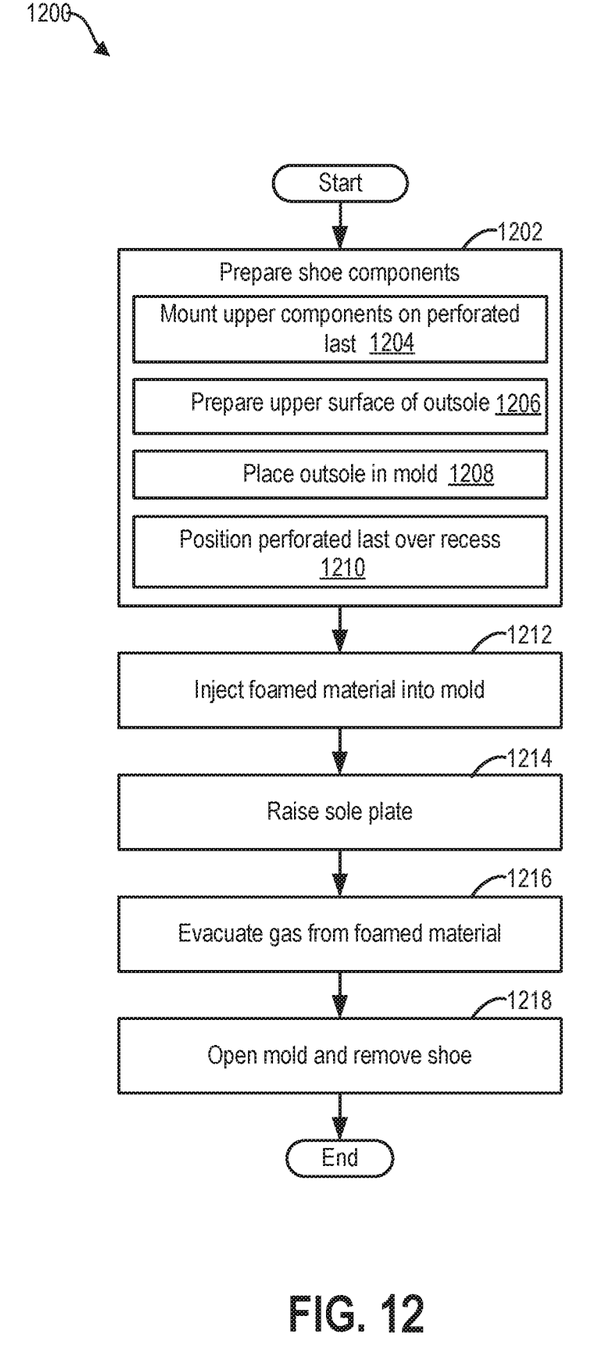
FIG. 12 shows an example of a method for manufacturing a shoe.
Figure 13:
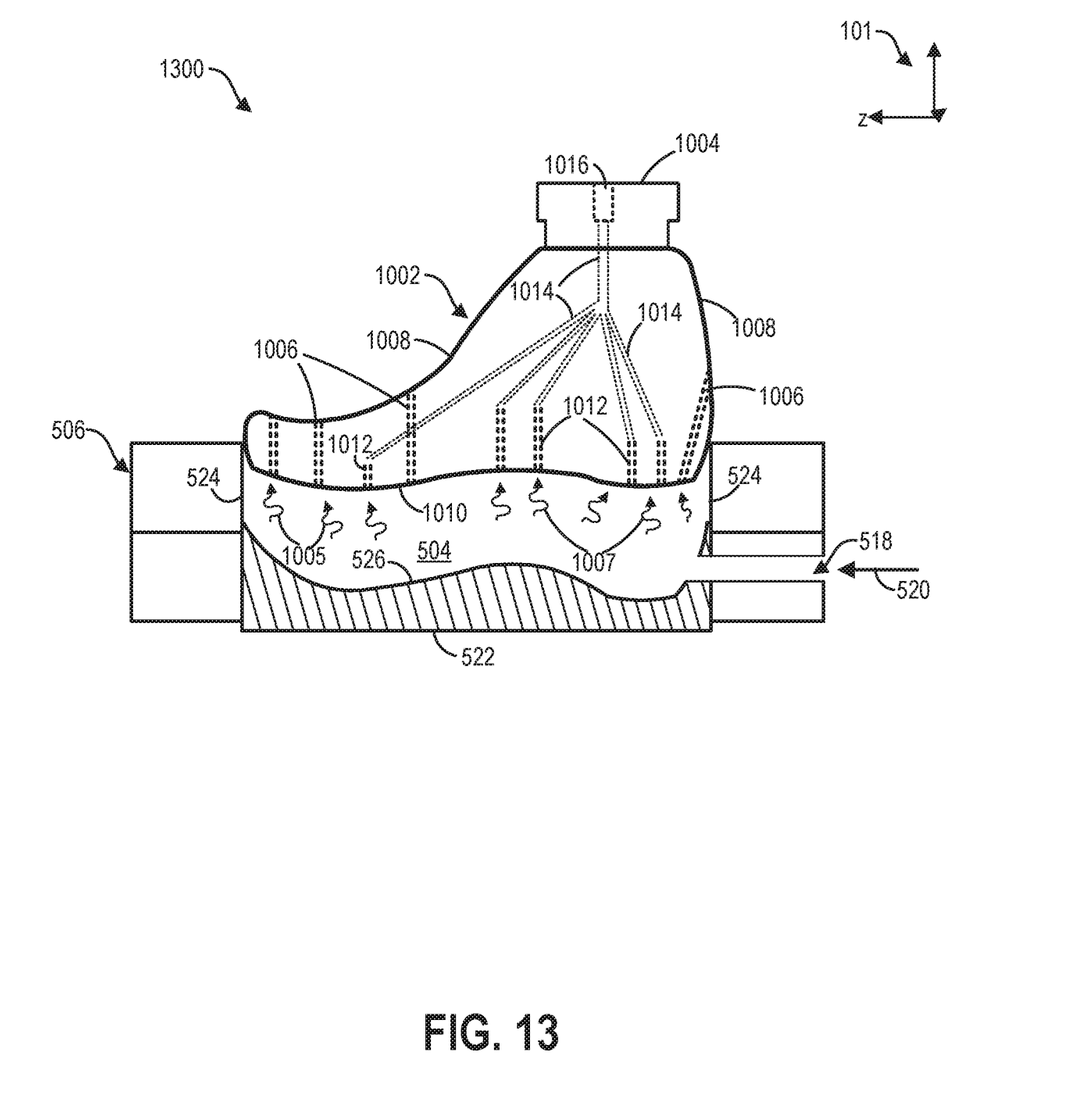
FIG. 13 shows a cross-section of a fourth example of a perforated last positioned over a mold during sole formation.

An example of a method 1200 for forming an article of footwear, such as a shoe, by an injection molding process is provided in FIG. 12. The method 1200 includes using a perforated last, such as the perforated last of FIGS. 3-4 and a mold with a cavity, such as the mold 404 of FIGS. 5-7 or the mold 506 of FIGS. 8-9 and 13. At 1202, the method includes preparing components of the shoe. The preparation may include mounting upper components of a shoe onto the perforated last. The upper components may include a preformed upper and a sock liner, or an upper with a seamed footbed or a single upper unit without a sock liner or footbed. Preparing the components may also include inserting the perforated last into the sock liner or upper with the upper wrapped around an upper portion of the last at 1204. The upper may be tightened by adjustment of a lacing system or by a Velcro fastening system.

Preparing the shoe components may also include preparing an upper surface of a preformed outsole by roughening and priming the surface at 1206. An adhesive such as cement may be applied to the upper surface of the outsole and the outsole may be heated to activate the cement. Furthermore, presparing the shoe components may include positioning the outsole at a bottom of the cavity of the mold at 1208, while a bottom piston of the mold, such as the bottom piston 412 of FIGS. 5-7 is in a lowered position. Preparation of the shoe components further include, at 1210, positioning the perforated last over the cavity of the mold so that the cavity is a closed sealed chamber.

At 1212, the method includes injecting a foamed material, such as polyurethane, through an inlet opening in a bottom half of the mold. The foamed material may fill a portion of the inner volume of the cavity. The bottom piston is raised at 1214 so that the outsole, resting on the bottom piston, is above the inlet opening in the bottom half of the mold and air surrounding the mold is not fluidly coupled to air in the cavity through the inlet opening.

At 1216, the method includes evacuating gas generated during curing of the foamed material. The gas may be evacuating by venting through a material of a bottom region of the sock liner (that is impermeable to the foamed material) and through perforations of the perforated last. The perforations may be fluidly coupled to an inner conduit of the perforated last. The evacuated gas may be emitted to the atmosphere via the inner conduit. The inner conduit may also be coupled to a vacuum source, such as a vacuum pump, to evacuate gases from the foamed material more efficiently.

Evacuation of gases from the foamed material of the midsole may occur for a duration of a hardening period of the foamed material, such as 5-8 minutes. As the foamed material hardens and cures, the material may percolate through Strobel stitches of a Strobel seam, as well as a material of the upper components, coupling the upper region of the sock liner to the bottom region of the sock liner, as well as to the upper, thereby securing the midsole to the upper. Alternatively, the foamed material may irreversibly couple to a seam allowance of a blind seam of the upper and footbed, similarly attaching the midsole to the upper of the shoe if a blind seam is present instead of the Strobel seam. At 1218 of the method, the mold is opened by separating a top half and the bottom half of the mold and the completed shoe is removed.

In this way, a shoe may be manufactured by using a perforated last and forming a midsole by injection molding. A foamed material may be injected, open poured, or casted into a mold and gases generated during curing of the foamed material may be evacuated through perforations of the perforated last. The perforations may be fluidly coupled to an inner conduit of the perforated last that may be coupled to a vacuum pump to assist in drawing gas bubbles, air traps, and voids out of the midsole. Reducing the presence of bubbles, air traps, and voids in the midsole may improve an aesthetic quality of the midsole. An effectiveness of coupling of the midsole to an upper of the shoe may be further enhanced by providing surfaces of a seam allowance of a blind seam, the blind seam attaching a footbed to the upper, for adherence. Alternatively, the foamed material may percolate through Strobel stitching of a Strobel seam of a sock liner, as well as through materials of the upper, to similarly attach the midsole to the upper of the shoe. The combination of the perforated last with direct coupling of the midsole to the sock liner provides a simpler, faster manufacturing process than conventional methods and reduces a likelihood of forming cosmetically degraded midsoles, thereby reducing costs and improving production efficiency.

In one embodiment, a method includes positioning a perforated last relative to a cavity of a mold; and injecting a material configured to form a foam into the cavity to form a sole directly attached to an upper around the perforated last. A first example of the method includes injecting the material into the cavity to form a midsole arranged between the upper and an outsole and wherein the material is injected through an inlet port of the mold, the inlet providing a single source of entry of the material into the cavity. A second example of the method optionally includes the first method and further includes wherein forming the midsole includes enclosing the material of the sole within continuous, gas-impermeable surfaces of the mold that do not include openings in addition to the inlet port and trapping the material of the midsole within the surfaces of the cavity of the mold when a bottom piston of the mold is raised while flowing gas through perforations of the perforated last from the midsole to an inner conduit of the last, the inner conduit forming an opening at a top of the last. A third example of the method optionally includes one or more of the first and second methods, and further includes, flowing gas through the perforations from the midsole to a manifold fluidly coupling the perforations to the inner conduit and wherein the inner conduit is coupled to a vacuum source. A fourth example of the method optionally includes one or more of the first through third examples, and further includes, mounting an upper of the article of footwear onto the perforated last. A fifth example of the method optionally includes one or more of the first through fourth examples, and further includes, wherein mounting the upper onto the perforated last includes inserting the perforated last into the upper attached to a seamed footbed, the seamed footbed coupled to the upper by a blind seam continuing around a perimeter of the footbed. A sixth example of the method optionally includes one or more of the first through fifth examples, and further includes, wherein attaching the midsole to the upper includes curing the foamed material around a seam allowance of the blind seam, the seam allowance extending downwards into the midsole. A seventh example of the method optionally includes one or more of the first through sixth examples, and further includes, wherein mounting the upper onto the perforated last includes positioning a sock liner between the upper and the perforated last and covering a bottom surface of the perforated last with a bottom region of the sock liner, the sock liner formed from a gas-permeable material. An eighth example of the method optionally includes one or more of the first through seventh examples, and further includes, wherein attaching the midsole to the upper includes engaging the foamed material with the bottom region of the sock liner so that the foamed material is in direct contact with a seam extending around a perimeter of the bottom region of the sock liner. A ninth example of the method optionally includes one or more of the first through eighth examples, and further includes, wherein attaching the midsole to the upper includes seeping the foamed material through gaps between Strobel stitches forming the seam of the sock liner, and through pores of a material of the upper, into an interior of the article of footwear, and curing the foamed material with a portion of the foamed material disposed in the interior of the article of footwear and coupled to the midsole via extensions of the foamed material through the gaps.

In another embodiment, a system includes, a perforated last, a mold with a cavity shaped to receive a bottom region of the perforated last, and an injection machine configured to couple to an inlet port in the mold and to inject a material configured to foam and form a sole. In a first example of the system, the perforated last has a plurality of perforations extending through a thickness of a wall of the perforated last, the plurality of perforations fluidly coupling air inside an inner conduit of the perforated last to air outside of the perforated last and wherein the plurality of perforations are clustered adjacent to regions of the midsole where an increased thickness of the sole is desired. A second example of the system optionally includes the first example, and further includes, wherein the plurality of perforations extend from an upper surface of the perforated last to a bottom surface of the perforated last. A third example of the system optionally includes one or more of the first and second examples, and further includes, wherein the plurality of perforations extend a portion of a distance between an upper surface and a bottom surface of the perforated last and wherein the plurality of perforations are fluidly coupled to air surrounding the perforated last, when the perforated last is positioned in the cavity of the mold, by a plurality of inner passages of the perforated last. A fourth example of the system optionally includes one or more of the first through third examples, and further includes, wherein the inner conduit of the perforated last is adapted to couple to a vacuum source and the inner conduit extends through an interior of the perforated last to an opening at a top of the perforated last and wherein the inner conduit is a channel for gas to be drawn from the foamed material of the sole, where the inner conduit is positioned between perforations of the perforated last and the vacuum source. A fifth example of the system optionally includes one or more of the first through fourth examples, and further includes, wherein a seam formed of Strobel stitches, spaced apart from one another, connects an upper of the shoe to a sock liner and wherein a portion of the foamed material is arranged within an interior of the shoe, along the seam of Strobel stitches and coupled to the sole by ligaments of foamed material extending through gaps between the Strobel stitches. A sixth example of the system optionally includes one or more of the first through fifth examples, and further includes, wherein a blind seam connects an upper of the shoe to a footbed of the shoe with a seam allowance extending downwards into the sole and wherein the sole is bonded to the seam allowance and the foamed material of the sole is maintained within the sole, below the seamed footbed.

In another embodiment, a sole of a shoe includes a foamed material, a seam positioned above the foamed material and in direct contact with the foamed material, the foamed material cured around the seam and forming a mechanical coupling with the seam without adhesive, and a surface impermeable to the foamed material and in face-sharing contact with an upper surface of the foamed material, wherein the midsole is free of macro bubbles, air traps, and voids. In a first example of the sole, the foamed material is polyurethane. A second example of the sole optionally includes the first example, and further includes wherein interfacing the foamed material with a perforated last during formation of the sole vents gases generated during curing of the foamed material.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for forming an article of footwear, comprising:
   positioning a perforated last relative to a cavity of a mold, wherein perforations on the perforated last are arranged in clusters positioned in regions of the perforated last associated with regions of a sole which are thicker than other regions of the sole, wherein the thicker regions comprise at least one of a heel region, an arch region, a ball region, and a toe region; and
   injecting a polymeric material into the cavity to form the sole directly attached to an upper around the perforated last,
   wherein injecting the polymeric material into the cavity forms a midsole arranged between the upper and an outsole and wherein the polymeric material is injected through an inlet port of the mold, the inlet port providing a single source of entry of the polymeric material into the cavity, and
   wherein forming the midsole includes enclosing the polymeric material of the midsole within continuous, gas-impermeable surfaces of the mold that do not include openings in addition to the inlet port and trapping the polymeric material of the midsole within the surfaces of the cavity of the mold when a bottom piston of the mold is raised while venting gas through perforations of the perforated last from the midsole to an inner conduit of the perforated last, the inner conduit forming an opening at a top of the perforated last.

2. The method of claim 1, further comprising the venting gas through the perforations from the midsole to a manifold fluidly coupling the perforations to the inner conduit and wherein the inner conduit is coupled to a vacuum source.

3. The method of claim 1, further comprising mounting the upper of the article of footwear onto the perforated last.

4. The method of claim 3, wherein mounting the upper onto the perforated last includes inserting the perforated last into the upper attached to a seamed footbed, the seamed footbed coupled to the upper by a blind seam continuing around a perimeter of the seamed footbed.

5. The method of claim 4, wherein attaching the midsole to the upper includes curing the polymeric material around a seam allowance of the blind seam, the seam allowance extending downwards into the midsole.

6. The method of claim 3, wherein mounting the upper onto the perforated last includes positioning a sock liner between the upper and the perforated last and covering a bottom surface of the perforated last with a bottom region of the sock liner, the sock liner formed from a gas-permeable material.

7. The method of claim 6, wherein attaching the midsole to the upper includes engaging the polymeric material with the bottom region of the sock liner so that the polymeric material is in direct contact with a seam extending around a perimeter of the bottom region of the sock liner.

8. The method of claim 7, wherein attaching the midsole to the upper includes the polymeric material seeping through gaps between Strobel stitches forming the seam of the sock liner, and through pores of a material of the upper, into an interior of the article of footwear, and curing the polymeric material with a portion of the polymeric material disposed in the interior of the article of footwear and coupled to the midsole via extensions of the polymeric material through the gaps.

* * * * *

UNITED STATES PATENT AND TRADEMARK OFFICE
CERTIFICATE OF CORRECTION

| | | |
|---|---|---|
| PATENT NO. | : 11,745,456 B2 | Page 1 of 1 |
| APPLICATION NO. | : 16/548648 | |
| DATED | : September 5, 2023 | |
| INVENTOR(S) | : Juan Manuel Calle | |

It is certified that error appears in the above-identified patent and that said Letters Patent is hereby corrected as shown below:

On the Title Page

Column 2, Foreign Patent Documents, Item (2), NPL: In the line reading "CN 200968386 Y 10/2007" should read --CN 200966386 Y 10/2007--.

Signed and Sealed this
Fifth Day of December, 2023

Katherine Kelly Vidal
*Director of the United States Patent and Trademark Office*